United States Patent
Okuyama et al.

(10) Patent No.: US 11,225,257 B2
(45) Date of Patent: Jan. 18, 2022

(54) DRIVING ASSISTANCE METHOD AND DRIVING ASSISTANCE DEVICE

(71) Applicants: Nissan Motor Co., Ltd., Yokohama (JP); Renault S.A.S., Boulogne-Billancourt (FR)

(72) Inventors: Takeshi Okuyama, Kanagawa (JP); Yuki Kakuda, Kanagawa (JP); Junichi Hatayama, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 112 days.

(21) Appl. No.: 16/650,363

(22) PCT Filed: Sep. 26, 2017

(86) PCT No.: PCT/JP2017/034782
§ 371 (c)(1),
(2) Date: Mar. 24, 2020

(87) PCT Pub. No.: WO2019/064350
PCT Pub. Date: Apr. 4, 2019

(65) Prior Publication Data
US 2020/0231158 A1   Jul. 23, 2020

(51) Int. Cl.
*B60W 30/18* (2012.01)
*B60W 60/00* (2020.01)
*G06K 9/00* (2006.01)

(52) U.S. Cl.
CPC .. *B60W 30/18163* (2013.01); *B60W 60/0054* (2020.02); *G06K 9/00798* (2013.01)

(58) Field of Classification Search
CPC ................................................ B60W 30/18163
See application file for complete search history.

(56) References Cited

U.S. PATENT DOCUMENTS

| | | | |
|---|---|---|---|
| 9,836,051 B2 | 12/2017 | Ishikawa et al. | |
| 10,562,534 B2* | 2/2020 | Minegishi | B60W 50/14 |
| 10,689,007 B2* | 6/2020 | Hiramatsu | B60W 50/082 |
| 10,744,967 B2* | 8/2020 | Lee | B60H 1/00357 |
| 11,079,762 B2* | 8/2021 | Matsunaga | B60W 30/18154 |
| 11,084,504 B2* | 8/2021 | Wray | B60W 60/0011 |
| 2016/0327947 A1 | 11/2016 | Ishikawa et al. | |
| 2016/0378112 A1* | 12/2016 | Ljubuncic | G06K 9/00845 701/45 |
| 2017/0197635 A1* | 7/2017 | Sato | B60W 30/10 |

(Continued)

FOREIGN PATENT DOCUMENTS

| CN | 105793910 A | | 7/2016 |
|---|---|---|---|
| CN | 107856672 A | * | 3/2018 |

(Continued)

*Primary Examiner* — Alex C Dunn
(74) *Attorney, Agent, or Firm* — Young Basile Hanlon & MacFarlane, P.C.

(57) ABSTRACT

A driving assistance method includes: extracting a point where a travel lane of a host vehicle joins another lane on a planned travel route of the host vehicle, as a high difficulty point where autonomous driving is difficult; and guiding switching of a traveling state of the host vehicle from autonomous driving to manual driving, at a point located at a predetermined distance before the high difficulty point.

11 Claims, 13 Drawing Sheets

(56) References Cited

U.S. PATENT DOCUMENTS

| | | | | |
|---|---|---|---|---|
| 2018/0281810 A1* | 10/2018 | Tochioka | .............. | B60W 40/09 |
| 2018/0326995 A1 | 11/2018 | Hiramatsu et al. | | |
| 2019/0039627 A1 | 2/2019 | Yamamoto | | |
| 2019/0064800 A1* | 2/2019 | Frazzoli | ................ | G05D 1/0223 |
| 2019/0064827 A1* | 2/2019 | Goto | ................. | B60W 60/0053 |
| 2020/0103903 A1* | 4/2020 | Kuwahara | ............ | G05D 1/0088 |
| 2020/0307596 A1* | 10/2020 | Yashiro | ................. | B60W 30/12 |
| 2021/0016805 A1* | 1/2021 | Oba | .................. | B60W 60/0057 |
| 2021/0163011 A1* | 6/2021 | Maru | ................. | G01C 21/3691 |

FOREIGN PATENT DOCUMENTS

| | | | | | |
|---|---|---|---|---|---|
| CN | 109843681 A | * | 6/2019 | ........... | G05D 1/0088 |
| CN | 112533809 A | * | 3/2021 | ............ | B60W 30/00 |
| DE | 112011103059 T5 | * | 6/2013 | ............ | G06F 17/00 |
| JP | 2006323671 A | * | 11/2006 | | |
| JP | 2010247804 A | * | 11/2010 | | |
| JP | 2016-017758 A | | 2/2016 | | |
| JP | 2016137203 A | * | 8/2016 | | |
| JP | 2017-004307 A | | 1/2017 | | |
| JP | 2017-019397 A | | 1/2017 | | |
| JP | WO2017077598 A1 | * | 10/2018 | .......... | B60W 30/146 |
| JP | WO2018084170 A1 | * | 2/2019 | ........ | G06K 9/00355 |
| JP | WO2018211583 A1 | * | 6/2019 | ............... | G08G 1/09 |
| WO | 2017/077598 A1 | | 5/2017 | | |
| WO | 2017/130482 A1 | | 8/2017 | | |

\* cited by examiner

DRIVING ASSISTANCE METHOD AND DRIVING ASSISTANCE DEVICE

TECHNICAL FIELD

The present invention relates to a driving assistance method and a driving assistance device.

BACKGROUND

JP 2017-004307 A describes a driving assistance device that, in a vicinity of a junction where a travel lane where the host vehicle is traveling merges with another road, determines whether or not there is any shielding object between the host vehicle and the other road, and, when there is a shielding object, moves the host vehicle in a direction where the other road is present, along a vehicle width direction.

SUMMARY

Depending on a road structure or the like of a junction point where the travel lane of a host vehicle joins another lane, a traffic condition of the other lane cannot be determined, and it is therefore difficult to continue autonomous driving. For example, when the host vehicle autonomously traveling tries to merge to a congested main lane, a determination is made under autonomous driving control after reaching the junction point that it is impossible to cut in front of another vehicle on the main lane, and then, switching of a traveling state of the host vehicle from autonomous driving to manual driving is guided. As a result, due to the guidance at the junction point, driver is forced to perform a sudden operation, which may confuse the driver.

It is an object of the present invention to suppress confusion of a driver caused by guiding, at a junction point, switching of the traveling state of a host vehicle from autonomous driving to manual driving.

According to one aspect of the present invention, there is provided a driving assistance method including: extracting a point where a travel lane of a host vehicle joins another lane on a planned travel route of the host vehicle, as a high difficulty point where autonomous driving is difficult; and guiding switching of a traveling state of the host vehicle from autonomous driving to manual driving, at a point located at a predetermined distance before the high difficulty point.

The object and advantages of the invention will be realized and attained by means of the elements and combinations particularly pointed out in the claims. It is to be understood that both the foregoing general description and the following detailed description are exemplary and explanatory and are not restrictive of the invention.

DETAILED DESCRIPTION

Hereinafter, embodiments of the present invention will be described with reference to the drawings.

First Embodiment (Structure)

Figure 1:
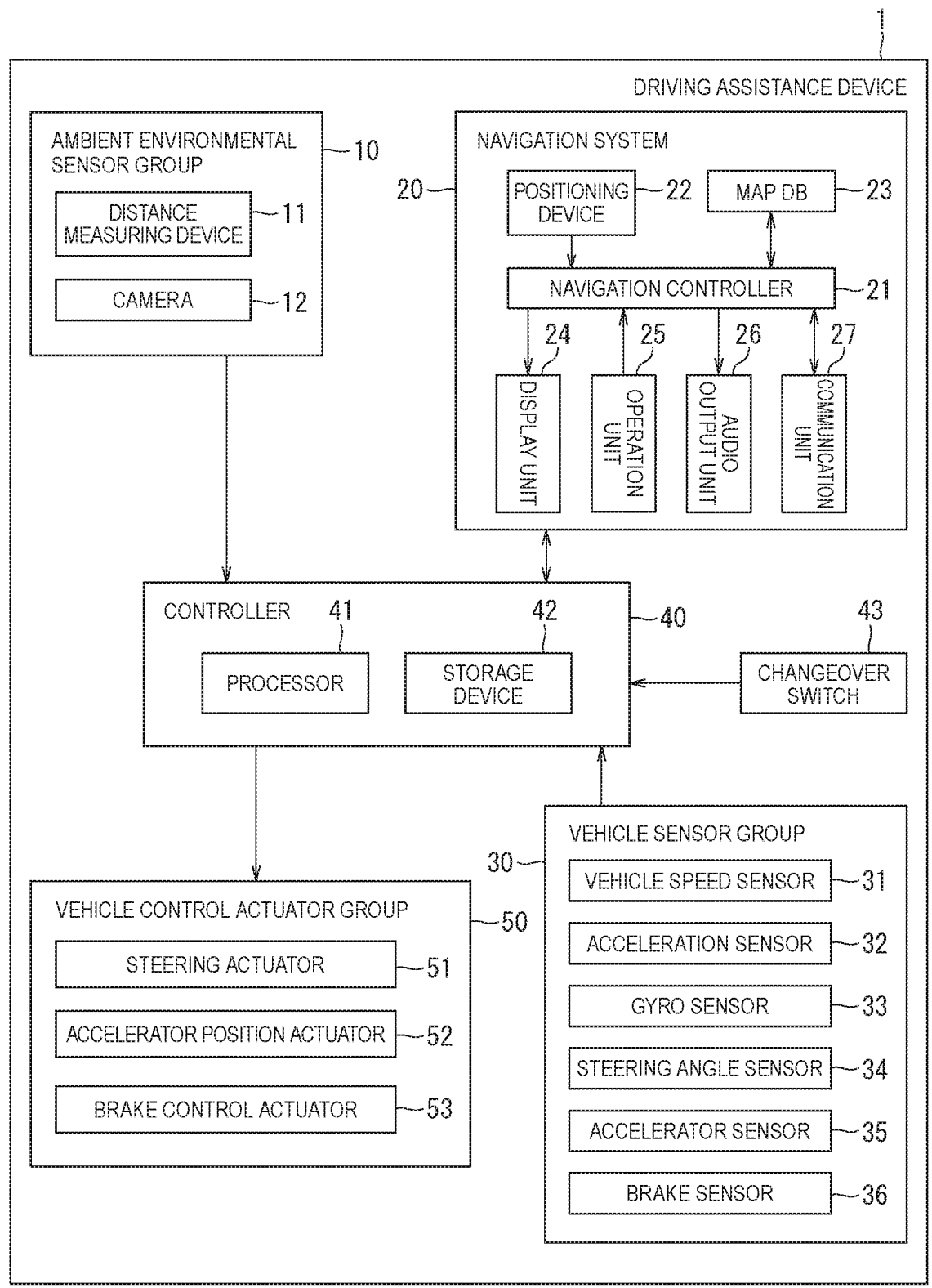
FIG. 1 is a diagram illustrating a schematic structural example of a driving assistance device of an embodiment.

Reference will be made to FIG. 1. A driving assistance device 1 performs travel assistance control, on a basis of a traveling environment around a vehicle (hereinafter referred to as "host vehicle") incorporating the driving assistance device 1, to autonomously steer and stop the host vehicle and performs autonomous driving control to autonomously drive the host vehicle without any driver intervention.

The driving assistance device 1 includes an ambient environmental sensor group 10, a navigation system 20, a vehicle sensor group 30, a controller 40, a changeover switch 43, and a vehicle control actuator group 50.

The ambient environmental sensor group 10 is a sensor group configured to detect an ambient environment of the host vehicle, for example, objects around the host vehicle. The ambient environmental sensor group 10 may include a distance measuring device 11 and a camera 12. The distance measuring device 11 and the camera 12 detect ambient environments, such as objects present around the host vehicle, relative positions between the vehicle and the objects, and distances between the vehicle and the objects.

The distance measuring device 11 may be, for example, a laser range-finder (LRF) or a radar.

The camera 12 may be, for example, a stereo camera. The camera 12 may be a single-eye camera, in which the same object may be photographed by the single-eye camera at a plurality of viewpoints to calculate a distance to the object.

The distance measuring device 11 and the camera 12 output ambient environment information that is information of the detected ambient environments to the controller 40.

The navigation system 20 recognizes a current position of the host vehicle and road map information at the current position. The navigation system 20 sets a travel route to a destination input by a vehicle occupant, and provides the occupant with route guidance according to the travel route. Furthermore, the navigation system 20 outputs information of the set travel route to the controller 40. When a traveling state of the host vehicle is an autonomous driving mode, the controller 40 autonomously drives the host vehicle such that the host vehicle travels along the travel route set by the navigation system 20.

The navigation system 20 includes a navigation controller 21, a positioning device 22, a map database 23, a display unit 24, an operation unit 25, an audio output unit 26, and a communication unit 27. Note that, in FIG. 1, the map database is represented as map DB.

The navigation controller 21 is an electronic control unit configured to control information processing operation of the navigation system 20. The navigation controller 21 includes a processor and peripheral components thereof.

The processor may be, for example, a central processing unit (CPU) or a micro-processing unit (MPU).

The peripheral components include a storage device and the like. The storage device may include any of a semiconductor storage device, a magnetic storage device, and an optical storage device. The storage device may include memories, such as register, cache memory, and read only memory (ROM) and random access memory (RAM) used as primary storage.

The positioning device 22 measures the current position of the host vehicle. The positioning device 22 may be, for example, a global positioning system (GPS) receiver. Additionally, the positioning device 22 may measure the current position of the host vehicle on the basis of a satellite signal of another satellite positioning system, such as a global navigation satellite system (GLONASS). Alternatively, the positioning device 22 may be an inertial navigation device.

The map database 23 stores road map data. The road map data includes information regarding road line types, road shapes, slopes, the number of lanes, legal speeds (speed limits), the presence or absence of junctions, and the like. The road line types include, for example, ordinary roads and highways.

In the navigation system 20, the display unit 24 outputs various pieces of visual information. For example, the display unit 24 may display a map screen around the host vehicle and guidance on a recommended route.

In the navigation system 20, the operation unit 25 receives operation by a vehicle occupant. The operation unit 25 may be, for example, a button, a dial, a slider, or the like, or may be a touch panel provided on the display unit 24. For example, the operation unit 25 may receive a destination input operation and an operation for switching the display screen of the display unit 24 by the vehicle occupant.

The audio output unit 26 outputs various pieces of audio information in the navigation system 20. The audio output unit 26 may output guidance on driving on the basis of the set travel route and road guidance information on the basis of road map data around the host vehicle.

The communication unit 27 performs wireless communication with a communication device outside the host vehicle. A communication system by the communication unit 27 may be, for example, wireless communication by a public mobile phone network, vehicle-to-vehicle communication, road-to-vehicle communication, or satellite communication.

The vehicle sensor group 30 includes sensors configured to detect the traveling state of the vehicle and sensors configured to detect driving operation performed by the driver.

The sensors configured to detect the traveling state of the vehicle include a vehicle speed sensor 31, an acceleration sensor 32, and a gyro sensor 33.

The sensors configured to detect driving operation include a steering angle sensor 34, an accelerator sensor 35, and a brake sensor 36.

The vehicle speed sensor 31 detects a wheel speed of the host vehicle, and calculates the speed of the host vehicle on the basis of the wheel speed.

The acceleration sensor 32 detects an acceleration in a longitudinal direction of the host vehicle, an acceleration in a vehicle widthwise direction thereof, and an acceleration in a vertical direction thereof.

The gyro sensor 33 detects an angular velocity of a rotation angle of the host vehicle about three axes including a roll axis, a pitch axis, and a yaw axis.

The steering angle sensor 34 detects a current steering angle that is a current rotation angle (steering operation amount) of a steering wheel serving as a steering operation element.

The accelerator sensor 35 detects an accelerator position of the vehicle. For example, the accelerator sensor 35 detects, as the accelerator position, a depression amount of an accelerator pedal of the vehicle.

The brake sensor 36 detects an amount of brake operation by the driver. For example, the brake sensor 36 detects, as the amount of brake operation, a depression amount of a brake pedal of the vehicle.

Information regarding the speed, acceleration, angular velocity, steering angle, accelerator position, and brake operation amount of the host vehicle detected by the respective sensors of the vehicle sensor group 30 is collectively referred to as "vehicle information". The vehicle sensor group 30 outputs the vehicle information to the controller 40.

The controller 40 is an electronic control unit configured to perform driving control of the host vehicle. The controller 40 includes a processor 41 and peripheral components such as a storage device 42. The processor 41 may be, for example, a CPU or an MPU.

The storage device 42 may include any of a semiconductor storage device, a magnetic storage device, and an optical storage device. The storage device 42 may include memories such as register, cache memory, and ROM and RAM used as primary storage.

Note that the controller 40 may be realized by a functional logic circuit set in a general-purpose semiconductor integrated circuit. For example, the controller 40 may include a programmable logic device (PLD), such as a field-programmable gate array (FPGA), or the like.

In the autonomous driving mode where autonomous driving control of the host vehicle is executed, the controller 40 produces a travel trajectory that causes the host vehicle to travel on the travel route set by the navigation system 20, on the basis of the ambient environmental information input from the ambient environmental sensor group 10 and the vehicle information input from the vehicle sensor group 30.

The controller 40 drives the vehicle control actuator group 50 such that the host vehicle travels on the produced travel trajectory, thereby allowing the vehicle to autonomously travel.

The vehicle control actuator group 50 operates the steering wheel, accelerator position, and braking device of the vehicle in response to a control signal from the controller 40 to cause a vehicle behavior of the vehicle to occur. The vehicle control actuator group 50 includes a steering actuator 51, an accelerator position actuator 52, and a brake control actuator 53.

The steering actuator 51 controls a steering direction and a steering amount of a steering of the vehicle.

The accelerator position actuator 52 controls an accelerator position of the vehicle.

The brake control actuator 53 controls brake operation of the braking device of the vehicle.

In a manual driving mode, the controller 40 drives the vehicle control actuator group 50 in response to, for example, the steering angle, accelerator position, and brake operation amount detected by the vehicle sensor group 30 to cause a vehicle behavior in accordance with operation of the driver to occur.

With operation of the changeover switch 43, the driver can switch the traveling state of the host vehicle between the autonomous driving mode and the manual driving mode.

The controller 40 switches the traveling state of the host vehicle between the autonomous driving mode and the manual driving mode in response to operation of the changeover switch 43 by the driver.

In addition, when any of the steering wheel, the accelerator pedal, and the brake pedal is operated by the driver during autonomous driving, i.e., when overriding occurs, the controller 40 switches the traveling state of the host vehicle from the autonomous driving mode to the manual driving mode.

Furthermore, when there is a point where autonomous driving is difficult on a route where the host vehicle is planned to travel (for example, a travel route for autonomous driving), the controller 40 guides switching of the traveling state of the host vehicle from autonomous driving to manual driving, at a point located at a predetermined distance before the high difficulty point.

Hereinafter, the route where the host vehicle is planned to travel may be referred to as "planned travel route". Additionally, the point where autonomous driving of the host vehicle is difficult (for example, a point where the host vehicle has high difficulty in autonomous driving) is referred to as "high difficulty point".

The high difficulty point may be, for example, a point where, depending on traffic conditions such as the degree of congestion, the difficulty of the driving of the host vehicle increases.

Figure 2:
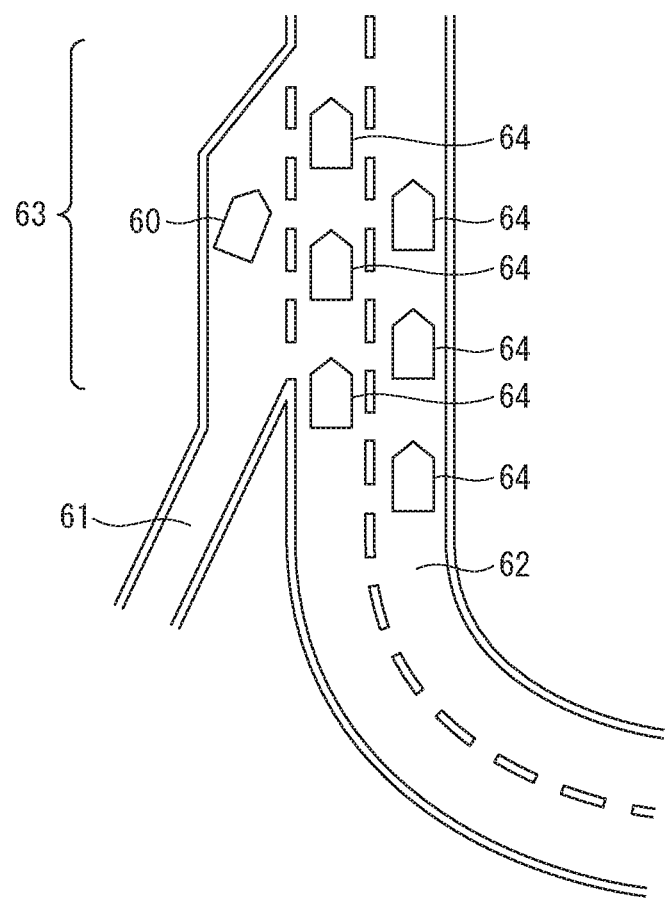
FIG. 2 is a diagram illustrating a first example of a high difficulty point.

For example, the high difficulty point includes a merging zone 63 where a merging lane 61 that is the travel lane of a host vehicle 60 merges with a merging destination lane 62 at a merging location where a plurality of roads merges together, as illustrated in FIG. 2. Hereinafter, the merging destination lane is referred to as "main lane" in the present specification.

When the host vehicle 60 is about to enter the main lane 62 in congestion, as illustrated in FIG. 2, the ambient environmental sensor group 10 detects that there are other vehicles 64, which are obstacles to entry of the host vehicle 60, on the main lane 62 in the merging zone 63. Due to the congestion, the plurality of other vehicles 64 is sequentially and continuously detected on the main lane 62, which makes it difficult to change lanes to the main lane 62 while autonomously driving.

In this case, if switching of the traveling state of the host vehicle from autonomous driving to manual driving is guided after the host vehicle 60 has reached the vicinity of the merging zone 63, the driver is forced to perform a sudden operation due to the switching guidance near the merging zone 63, which may confuse the driver.

Thus, the controller 40 extracts a high difficulty point on a planned travel route, and guides switching of the traveling state of the host vehicle from autonomous driving to manual driving, at a point located at a predetermined distance D1 before the high difficulty point.

As a result, before the high difficulty point, the traveling state can be switched from autonomous driving to manual driving, so that the driver can afford to start manual driving.

Figure 3:
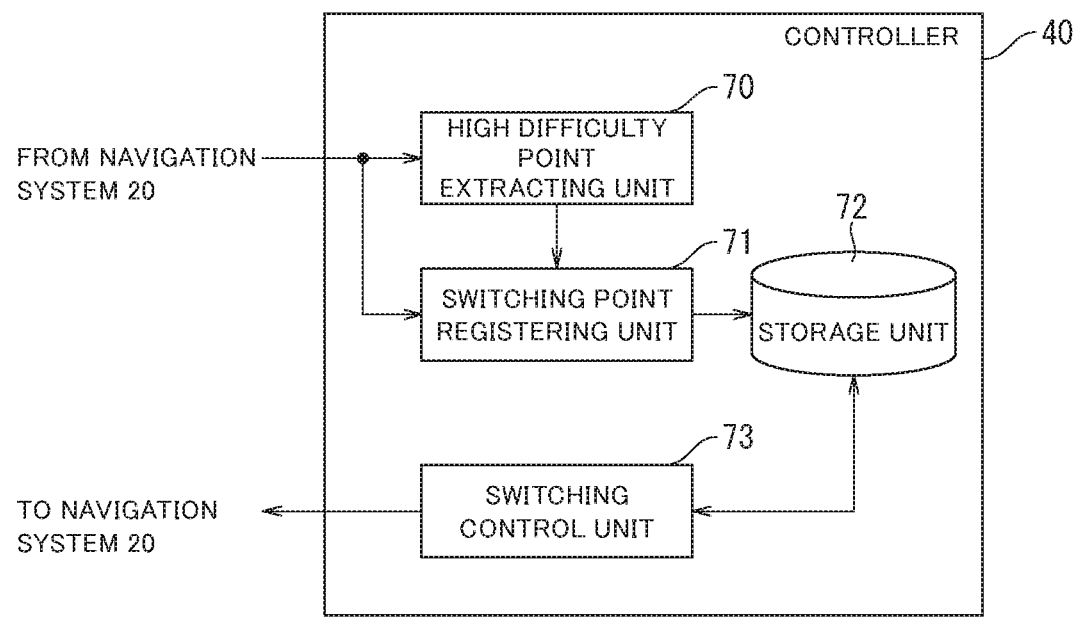
FIG. 3 is a block diagram illustrating one example of a functional structure of a controller included in FIG. 1.

Next will be a description of a functional structure of the controller 40. Reference will be made to FIG. 3. The controller 40 includes a high difficulty point extracting unit 70, a switching point registering unit 71, a storage unit 72, and a switching control unit 73.

Functions of the high difficulty point extracting unit 70, the switching point registering unit 71, and the switching control unit 73 may be realized by causing the processor 41 of the controller 40 to execute a computer program stored in the storage device 42.

The high difficulty point extracting unit 70 acquires, from the navigation system 20, road map data of respective points on the planned travel route set by the navigation system 20. The high difficulty point extracting unit 70 extracts a high difficulty point present on the planned travel route on the basis of the road map data acquired from the navigation system 20.

For example, the high difficulty point extracting unit 70 may extract, as a high difficulty point, a point where the travel lane of the host vehicle joins another lane.

The point where the travel lane of the host vehicle joins another lane also includes, for example, a merging zone where the travel lane of the host vehicle merges to another lane. The high difficulty point extracting unit 70 may extract, for example, the merging zone 63 illustrated in FIG. 4A as a high difficulty point.

The merging zone 63 is a merging zone where merging to the main lane 62 involves a lane change from the merging lane 61 to the main lane 62.

Figure 4A:
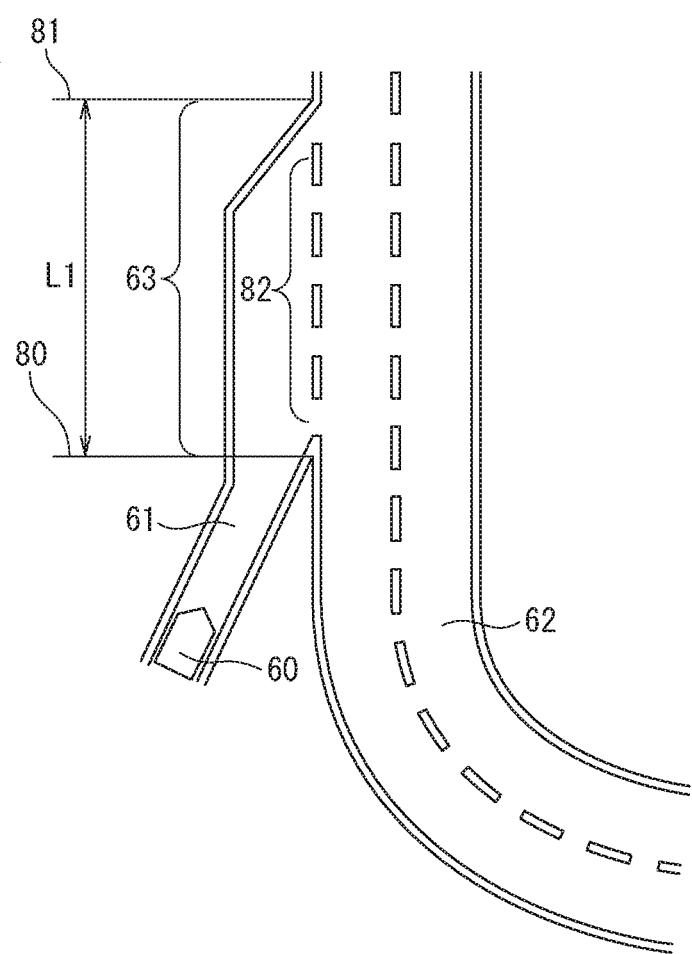
FIG. 4A is a diagram illustrating a first example of a merging zone that is a high difficulty point.
Figure 4B:
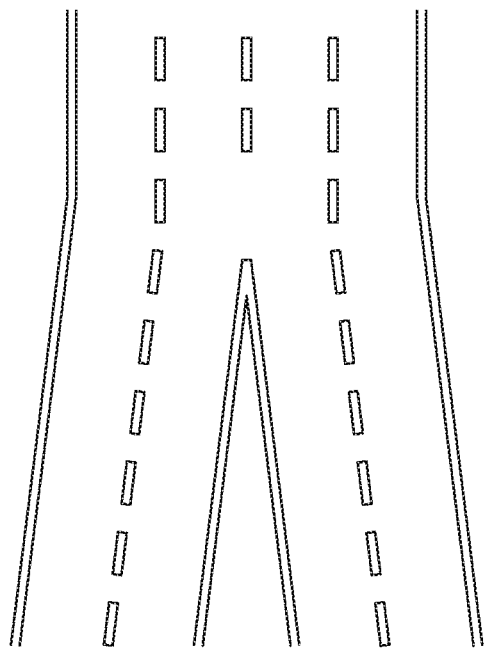
FIG. 4B is a diagram illustrating one example of a merging zone that is not a high difficulty point.

Among locations where a plurality of lanes merges together, there are those where no lane change is necessary on the merging point, as in a merging point illustrated in FIG. 4B. The high difficulty point extracting unit 70 may exclude the merging point illustrated in FIG. 4B from high difficulty points.

Reference will be made to FIG. 4A. There is less chance to make a lane change to the main lane 62, as the period of time during which the host vehicle 60 can stay in a zone from a starting point 80 of the merging zone 63 to an ending point 81 thereof is shorter. As a result, merging to the main lane 62 becomes more difficult.

Thus, for example, the high difficulty point extracting unit 70 may extract the merging zone 63 as a high difficulty point when a distance L1 from the starting point 80 of the merging zone 63 to the ending point 81 thereof is below a threshold value.

The threshold value may be set to, for example, a distance in which merging can be tried substantially only once from the starting point 80. Alternatively, the threshold value may be set to a distance in which it is impossible to travel for three seconds or more after giving a turn signal in the merging zone 63.

Additionally, for example, the high difficulty point extracting unit 70 predicts the speed of the host vehicle 60 in the merging zone 63, and, on the basis of the predicted speed and the distance L, predicts travel time of the host vehicle 60 from the starting point 80 to the ending point 81. When the travel time is below a threshold value, the merging zone 63 may be extracted as a high difficulty point. The high difficulty point extracting unit 70 may predict the speed of the host vehicle 60 in the merging zone 63 on the basis of a legal speed limit in the merging zone 63 or on the basis of a current speed of the host vehicle 60.

Figure 5A:
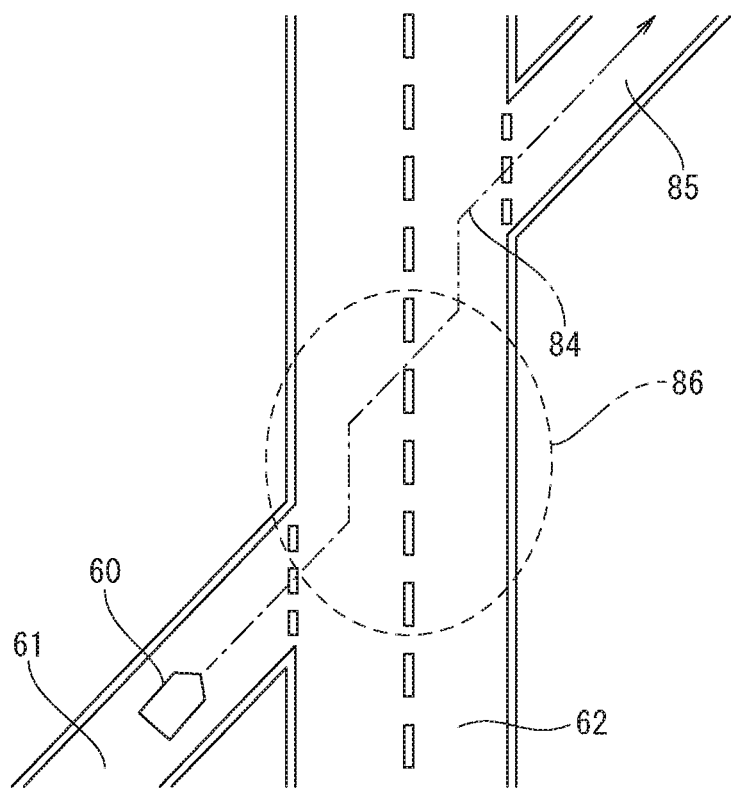
FIG. 5A is a diagram illustrating a second example of a high difficulty point.

Reference will be made to FIG. 5A. For example, the high difficulty point extracting unit 70 may extract, as a high difficulty point, a point where the planned travel route set by the navigation system 20 requires a lane change. A travel route 84 illustrated in FIG. 5A enters a plurality of lanes 62 from the lane 61, crosses the plurality of lanes 62, and then advances to a lane 85. Due to this, the travel route 84 requires a lane change in a zone indicated by a reference sign 86.

In addition, the high difficulty point extracting unit 70 may also extract, as a high difficulty point, not only the merging zone 63 where the merging lanes 61 and 62 are divided by a road dividing line (broken line) 82, as illustrated in FIG. 4A, but also a merging zone where a plurality of merging lanes is not divided by a road dividing line.

Figure 5B:
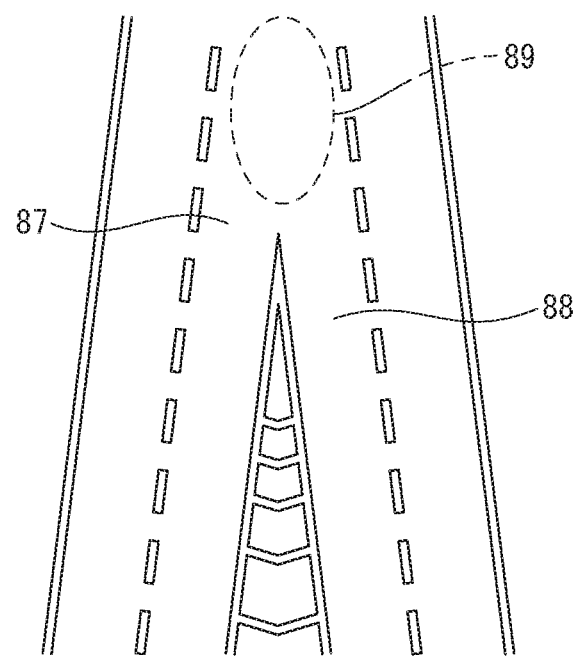
FIG. 5B is a diagram illustrating a second example of a merging zone that is a high difficulty point.

A merging zone 89 of FIG. 5B is an example of a merging zone where merging lanes 87 and 88 are not divided by a road dividing line.

Reference will be made to FIG. 3. At a point located at the predetermined distance D1 before a high difficulty point extracted by the high difficulty point extracting unit 70, the switching point registering unit 71 determines whether or not to guide switching of the traveling state of the host vehicle 60 from autonomous driving to manual driving.

If it is determined that the switching should be guided, the switching point registering unit 71 registers the point located at the predetermined distance D1 before the high difficulty point extracted by the high difficulty point extracting unit 70 as the point where switching of the traveling state of the host vehicle 60 from autonomous driving to manual driving is guided. For example, the switching point registering unit 71 records the point located at the predetermined distance D1 before the high difficulty point in the storage unit 72.

Hereinafter, the point where the switching of the traveling state of the host vehicle 60 from autonomous driving to manual driving is guided will be referred to as "switching point".

Note that the switching point registering unit 71 may register the switching point by recording the high difficulty point in the storage unit 72, instead of the point located at the predetermined distance D1 before the high difficulty point.

For example, at a point located at the predetermined distance D1 before the merging zone 63, the switching point registering unit 71 determines whether or not to guide switching of the traveling state from autonomous driving to manual driving.

If a traffic condition of the main lane 62 cannot be determined until the host vehicle 60 reaches the vicinity of the merging zone 63, and difficulty in merging while autonomously driving cannot be determined, it is uncertain whether or not switching of the traveling state from autonomous driving to manual driving can be guided with a time allowance. Thus, if it is expected that the traffic condition of the main lane 62 cannot be determined at the point located at the predetermined distance D1 before the merging zone 63, the switching point registering unit 71 registers the point located at the predetermined distance D1 before the merging zone 63 as a switching point.

On the other hand, if it is expected that the traffic condition of the main lane 62 can be determined at the point located at the predetermined distance D1 before the merging zone 63, switching to manual driving can be guided at timing in accordance with the traffic condition of the main lane 62. Accordingly, if determination on the traffic condition of the main lane 62 is expected to be possible at the point located at the predetermined distance D1 before the merging zone 63, the switching point registering unit 71 does not register the point located at the predetermined distance D1 before the merging zone 63 as a switching point. Thus, autonomous driving is continued, which can reduce a driving load on the driver.

For example, when the main lane 62 is hidden in a blind spot of the ambient environmental sensor group 10 at the point located at the predetermined distance D1 before the merging zone 63, the switching point registering unit 71 registers the point located at the predetermined distance D1 before the merging zone 63 as a switching point.

Figure 6:
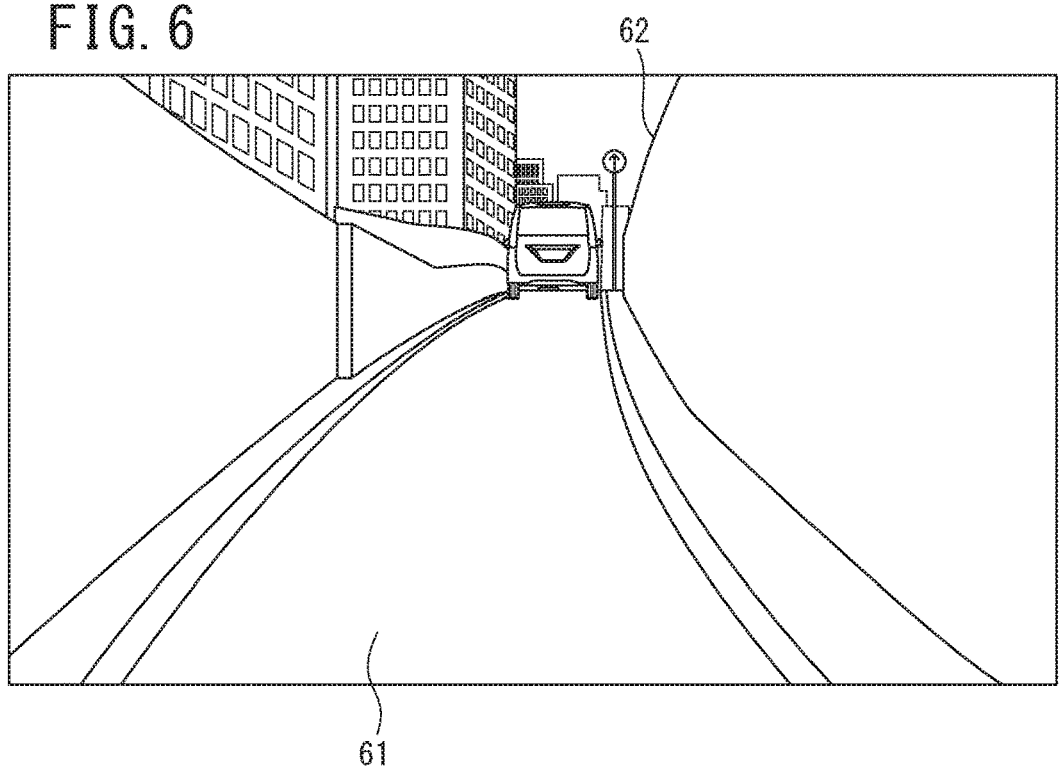
FIG. 6 is a diagram depicting a first example of a point where switching guidance is provided.

Reference will be made to FIG. 6. If a height difference between the travel lane 61 of the host vehicle 60 and the main lane 62 is equal to or more than a predetermined value H1, and the travel lane 61 is lower than the main lane 62 at the point located at the predetermined distance D1 before the merging zone 63, the main lane 62 is hidden in a blind spot created by a road structure.

Accordingly, when the height difference between the travel lane 61 of the host vehicle 60 and the main lane 62 is equal to or more than the predetermined value H1, and the travel lane 61 is lower than the main lane 62 at the point located at the predetermined distance D1 before the merging zone 63, the switching point registering unit 71 registers the point located at the predetermined distance D1 before the merging zone 63 as a switching point.

On the other hand, even if the height difference between the travel lane 61 and the main lane 62 is equal to or more than the predetermined height H1, when the travel lane 61 is higher than the main lane 62, there is no blind spot. Accordingly, the switching point registering unit 71 does not register the point as a switching point.

Figure 7:
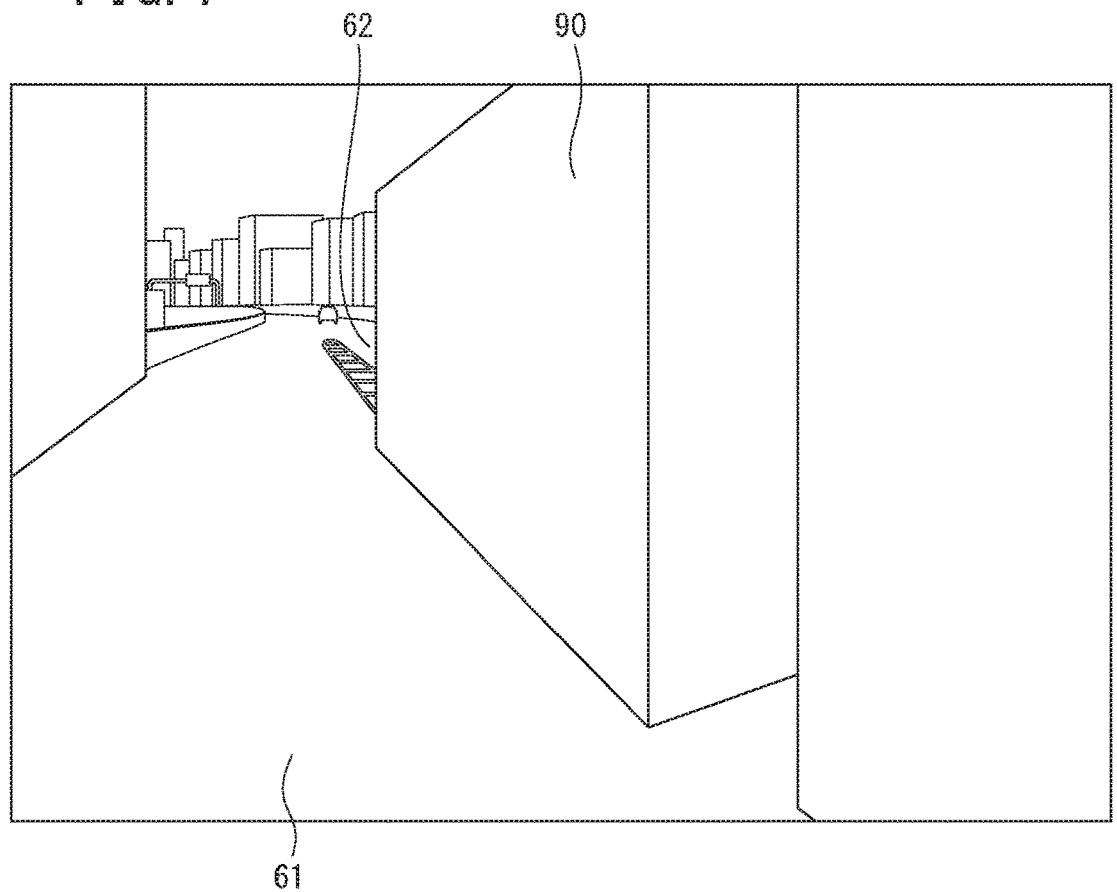
FIG. 7 is a diagram depicting a second example of the point where switching guidance is provided.

Reference will be made to FIG. 7. When there is a shielding object 90 having a predetermined height H2 or more between the travel lane 61 and the main lane 62 at the point located at the predetermined distance D1 before the merging zone 63, the main lane 62 is hidden in a blind spot created by the shielding object 90.

Accordingly, when the shielding object 90 having the predetermined height H2 or more is present between the travel lane 61 and the main lane 62 at the point located at the predetermined distance D1 before the merging zone 63, the switching point registering unit 71 registers the point located at the predetermined distance D1 before the merging zone 63 as a switching point regardless of the height difference between the travel lane 61 and the main lane 62.

On the other hand, when the shielding object 90 having the predetermined height H2 or more is not present, the switching point registering unit 71 does not register the point as a switching point.

Figure 8:
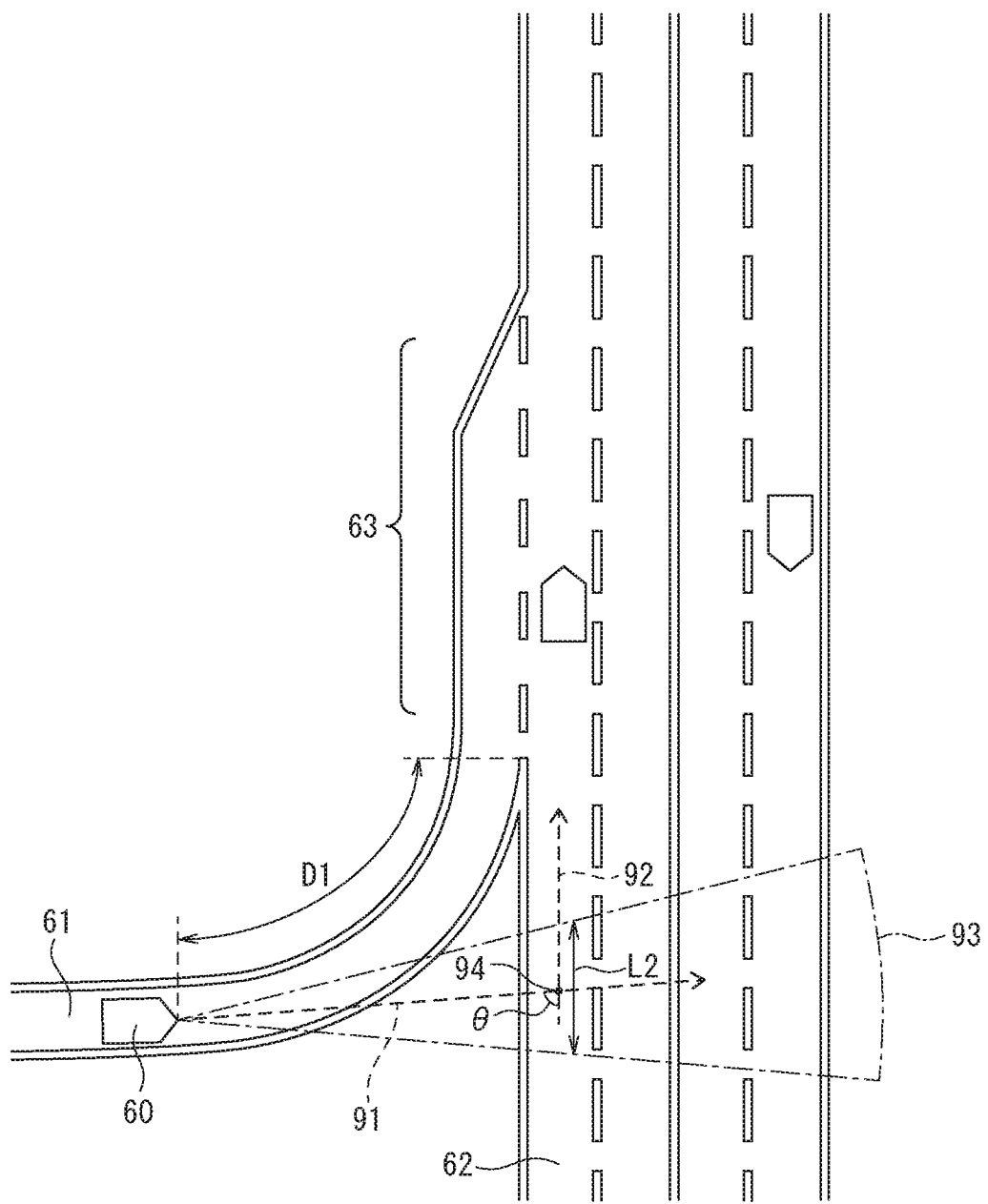
FIG. 8 is a diagram depicting a third example of the point where switching guidance is provided.
Figure 9:
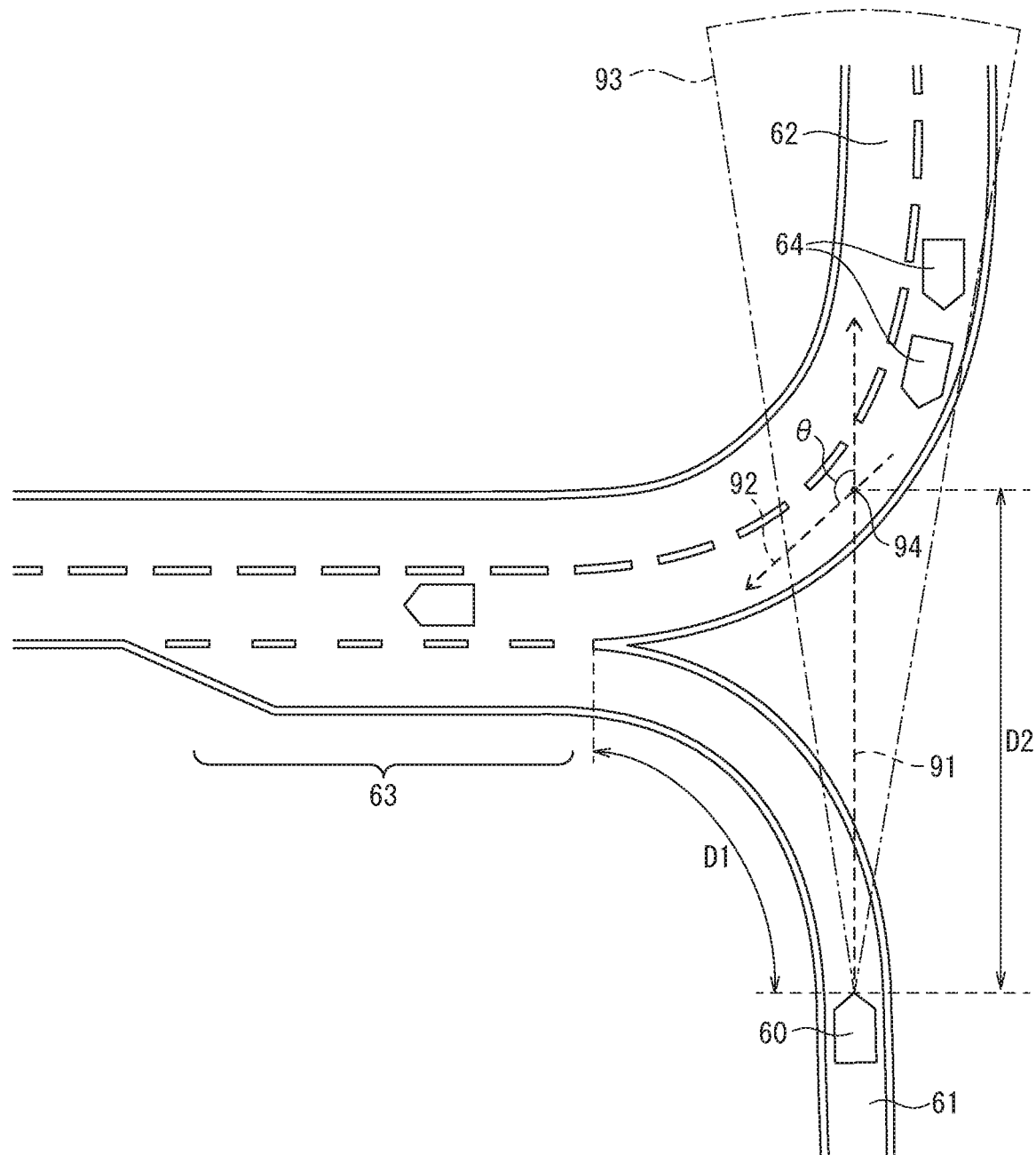
FIG. 9 is a diagram depicting a fourth example of the point where switching guidance is provided.

Furthermore, at the point located at the predetermined distance D1 before the merging zone 63, the traffic condition of the main lane 62 may not be able to be determined due to a road shape of the travel lane 61 of the host vehicle 60 and a road shape of the main lane 62. FIG. 8 and FIG. 9 illustrate examples of cases where the traffic condition of the main lane 62 cannot be determined to the road shapes.

Reference will be made to FIG. 8. When a difference θ between a traveling direction 91 of the travel lane 61 at the point located at the predetermined distance D1 before the merging zone 63 and a traveling direction 92 of the main lane 62 is large, a length L2 of a range of the main lane 62 (i.e., a range where the traffic condition is detectable by the ambient environmental sensor group 10) falling within a detection range 93 of the ambient environmental sensor group 10 ahead of the host vehicle 60 becomes short, so that the traffic condition of the main lane 62 may not be able to be determined.

Reference will be made to FIG. 9. When the difference θ between the traveling direction 91 of the travel lane 61 and the traveling direction 92 of the main lane 62 further increases and becomes close to 180 degrees, one other vehicle 64 is hidden by the other vehicle 64 as viewed from the point at the predetermined distance D1 before the merging zone 63, so that the traffic condition of the main lane 62 may not be able to be determined.

Note that, when the main lane 62 is curved, as illustrated in FIG. 9, "the traveling direction 92 of the main lane 62" may be defined as a traveling direction of the main lane 62 at a point 94 where an extended line of the traveling direction 91 of the travel lane 61 at the point located at the predetermined distance D1 before the merging zone 63 intersects with the main lane 62.

When the difference θ between the traveling direction 91 of the travel lane 61 at the point located at the predetermined distance D1 before the merging zone 63 and the traveling direction 92 of the main lane 62 is equal to or more than a predetermined threshold value, the switching point registering unit 71 registers the point located at the predetermined distance D1 before the merging zone 63 as a switching point.

For example, the threshold value of the difference θ may be set on the basis of a threshold value L3 of a length of a range where the traffic condition of the main lane 62 is to be detected by the ambient environmental sensor group 10

Figure 10:
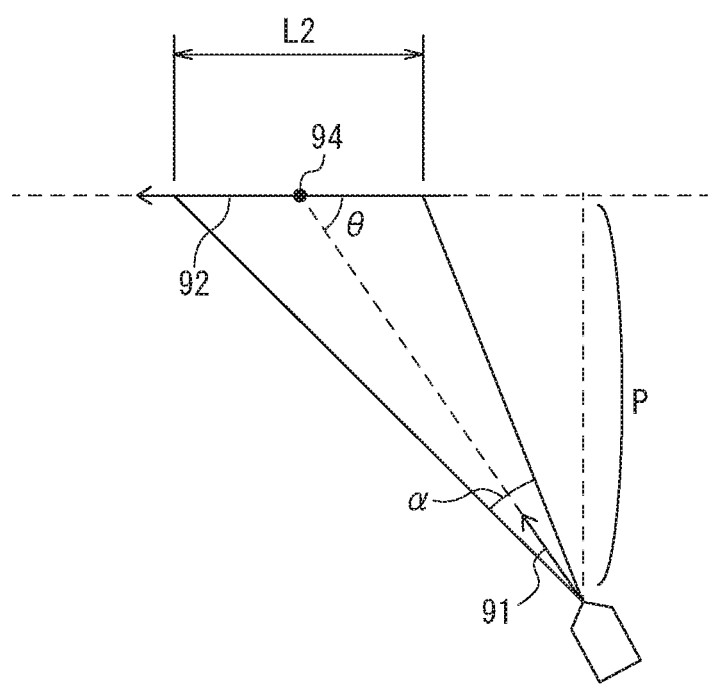
FIG. 10 is a diagram depicting conditions under which switching guidance is provided.

Reference will be made to FIG. 10. For example, assume that the detection range of the ambient environmental sensor group 10 is a range of an azimuth angle width a centered on the traveling direction 91 of the host vehicle 60, and a length of a perpendicular line from the point located at the predetermined distance D1 before the merging zone 63 to an extended line of the traveling direction 92 of the main lane 62 is P.

The length L2 of the detection range of the main lane 62 detected by the ambient environmental sensor group 10 can be obtained by the following equation (1):

$$L2 = P(\tan(90°-\theta+\alpha/2) - \tan(90°-\theta-\alpha/2)) \quad (1)$$

The threshold value of the difference θ can be calculated as an upper limit value of a range of the difference θ where the length L2 is longer than the threshold value L3.

Reference will be made to FIG. 9. There is a portion 94 of the main lane 62 on the extended line of the traveling direction 91 of the travel lane 61 at a point located at the predetermined distance D1 before the merging zone 63. Assume that a distance from the point located at the predetermined distance D1 before the merging zone 63 to the portion 94 is D2.

When the distance D2 is too long, a detection resolution of the other vehicle 64 on the main lane 62 falling within the detection range 93 of the ambient environmental sensor group 10 may be reduced, whereby it may be impossible to determine the traffic condition of the main lane 62.

Accordingly, when the distance D2 between the portion 94 of the main lane 62 present on the extended line of the traveling direction 91 of the travel lane 61 at the point located at the predetermined distance D1 before the merging zone 63 and the point located at the predetermined distance D1 before the merging zone 63 is equal to or more than a predetermined value, the switching point registering unit 71 registers the point located at the predetermined distance D1 before the merging zone 63 as a switching point.

The high difficulty point is not limited to only the merging zone 63, and may be a point having another road shape where the travel lane of the host vehicle joins another lane.

For example, the high difficulty point extracting unit 70 may extract an intersection where the travel lane 61 of the host vehicle intersects with another lane, as the point where the travel lane 61 of the host vehicle joins another lane. The intersection may include, for example, a crossroads, a T-intersection, and the like.

Figure 11:
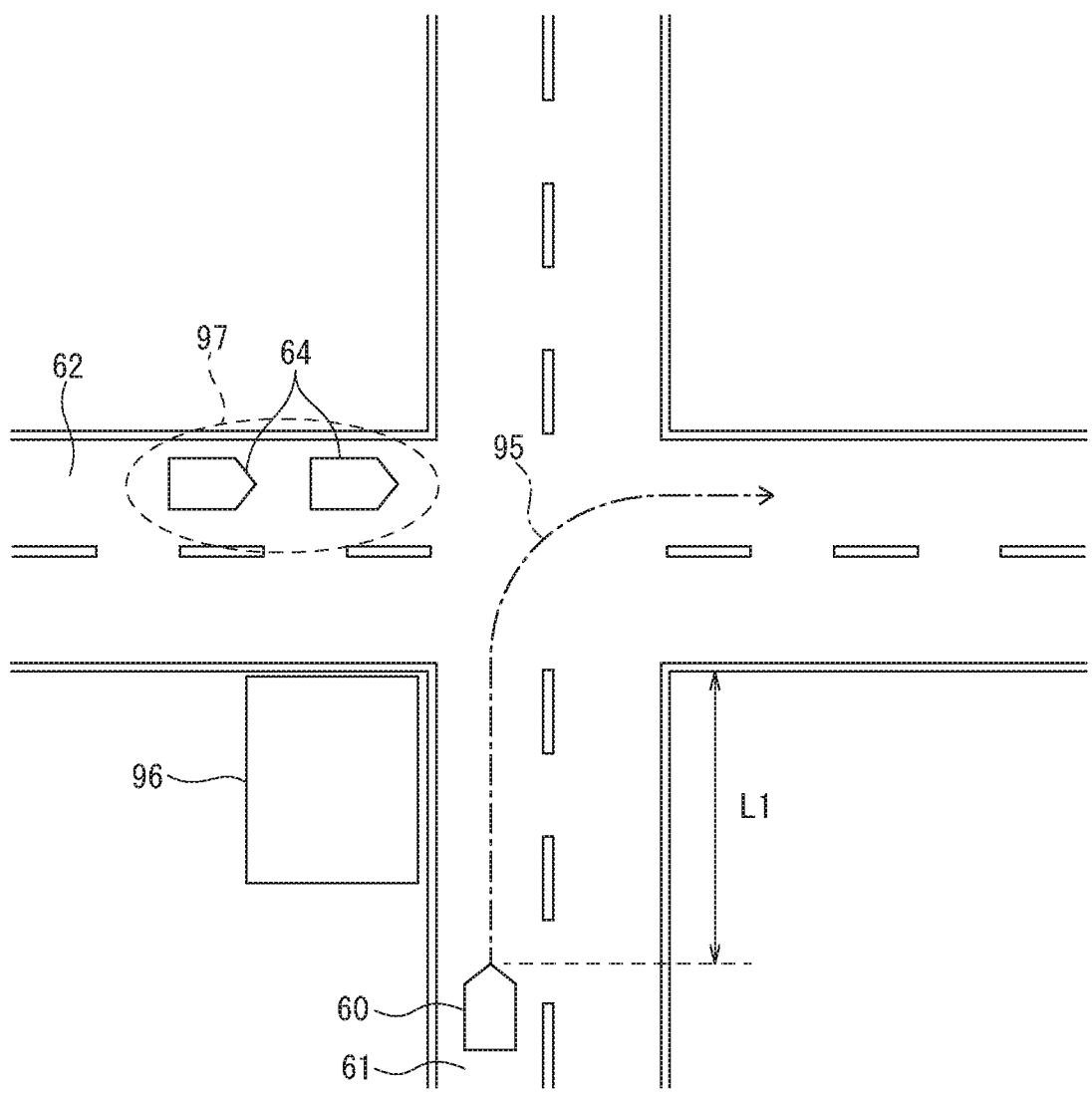
FIG. 11 is a diagram illustrating one example of an intersection.

Reference will be made to FIG. 11. For example, the high difficulty point extracting unit 70 may extract an intersection where the travel lane 61 of the host vehicle intersects with another lane 62, as a high difficulty point.

For example, when turning right along a travel trajectory 95 of autonomous driving at the intersection of the travel lane 61 and the other lane 62, when the other vehicles 64 that are obstacles to the host vehicle 60 turning right are present due to congestion of the other lane 62, it may be difficult to make a lane change to the main lane 62. The same also applies to a case where the host vehicle 60 turns left.

In this case, if the traffic condition of the other lane 62 cannot be determined until the host vehicle 60 reaches a vicinity of the intersection, and difficulty in merging while autonomously driving cannot be determined, it is uncertain whether or not switching of the traveling state from autonomous driving to manual driving can be guided with a time allowance.

Thus, when it is expected that the traffic condition of the other lane 62 cannot be determined at a point located at the predetermined distance D1 before the intersection, the switching point registering unit 71 registers the point located at the predetermined distance D1 before the intersection as a switching point. For example, the switching point registering unit 71 records the point located at the predetermined distance D1 before the intersection in the storage unit 72.

Note that the switching point registering unit 71 may register the switching point by storing the intersection, instead of the point located at the predetermined distance D1 before the intersection, in the storage unit 72.

On the other hand, when it is expected that the traffic condition of the other lane can be determined at the point located at the predetermined distance D1 before the intersection, switching to manual driving can be guided at timing in accordance with the traffic condition of the other lane 62. Accordingly, when determination on the traffic condition of the other lane 62 is expected to be possible at the point located at the predetermined distance D1 before the intersection, the switching point registering unit 71 does not register the point located at the predetermined distance D1 before the intersection as a switching point. Thus, autonomous driving is continued, which can reduce a driving load on the driver.

For example, when there is a roadside zone within a predetermined radius R from a center of the intersection, it can be expected that the intersection has good visibility, and therefore the traffic condition of the other lane 62 can be determined at a point located at the predetermined distance D1 before the intersection. Thus, the switching point registering unit 71 does not register the point located at the predetermined distance D1 before the intersection as a switching point.

In addition, when there is a pedestrian road before the intersection, again, the switching point registering unit 71 does not register a point located at the predetermined distance D1 before the intersection as a switching point.

On the other hand, when there is no roadside zone or pedestrian road, and there is a shielding object 96 at a corner of the intersection, the switching point registering unit 71 registers a point located at the predetermined distance D1 before the intersection as a switching point.

For example, when the other vehicles 64 are present within a range indicated by a dotted line 97 on the other lane 62, it is difficult to perform autonomous driving along the travel trajectory 95. Thus, when the range 97 is hidden behind the shielding object 96 as viewed from the point located at the predetermined distance D1 before the intersection, the switching point registering unit 71 registers the point located at the predetermined distance D1 before the intersection as a switching point.

Reference will be made to FIG. 3. While the host vehicle 60 is autonomously driving, the switching control unit 73 reads the switching point recorded in the storage unit 72. The switching control unit 73 determines whether or not the host vehicle 60 has reached the switching point.

When the host vehicle 60 has reached the switching point, the switching control unit 73 guides switching of the traveling state of the host vehicle 60 from the autonomous driving mode to the manual driving mode.

When a high difficulty point is stored in the storage unit 72 instead of a point located at the predetermined distance D1 before the high difficulty point, the switching control unit 73 determines whether or not the host vehicle 60 has reached the point located at the predetermined distance D1 before the high difficulty point. When the host vehicle 60 has reached the point located at the predetermined distance D1 before the high difficulty point, the switching control unit 73 guides switching of the traveling state of the host vehicle 60 from the autonomous driving mode to the manual driving mode.

For example, the switching control unit 73 may output, from the audio output unit 26 of the navigation system 20, an audio guidance message for prompting the driver to switch the traveling state of the host vehicle 60 from the autonomous driving mode to the manual driving mode by operating the changeover switch 43.

Alternatively, for example, the switching control unit 73 may output, from the audio output unit 26, an audio guidance message for prompting the driver to switch the traveling state of the host vehicle 60 from the autonomous driving mode to the manual driving mode by operating any of the steering wheel, the accelerator pedal, or the brake pedal.

Alternatively, for example, the switching control unit 73 may display, on the display unit 24 of the navigation system 20, a visual guidance message for prompting the driver to switch the traveling state of the host vehicle 60 from the autonomous driving mode to the manual driving mode by operating the changeover switch 43.

Alternatively, for example, the switching control unit 73 may display, on the display unit 24, a visual guidance message for prompting the driver to switch the traveling state of the host vehicle 60 from the autonomous driving mode to the manual driving mode by operating any of the steering wheel, the accelerator pedal, or the brake pedal.

Alternatively, the switching control unit 73 may output, from the audio output unit 26 or the display unit 24, an audio guidance message or a visual guidance message for notifying the driver that the traveling state of the host vehicle 60 will be autonomously switched from the autonomous driving mode to the manual driving mode.

(Operation)

Figure 12:
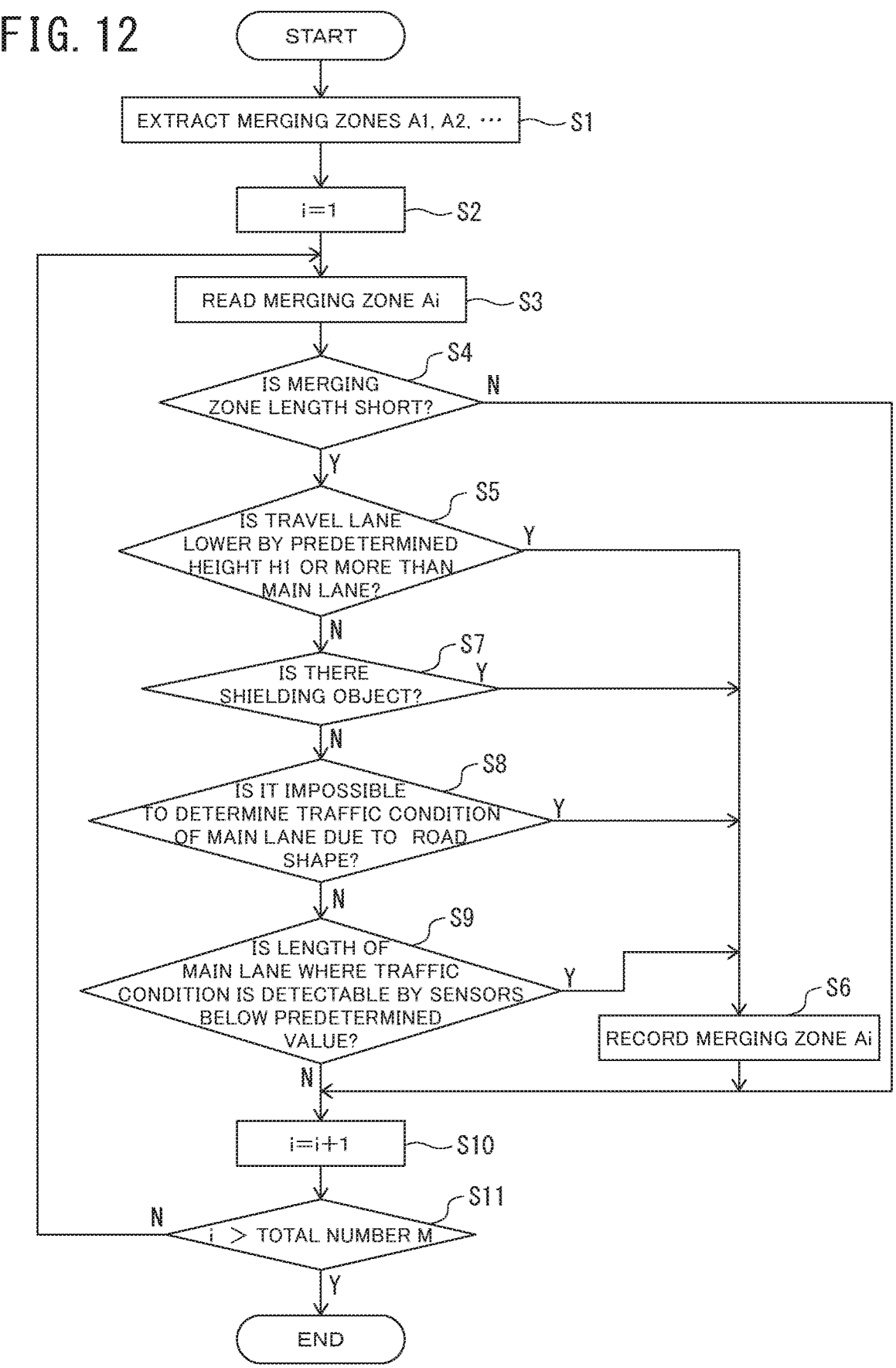
FIG. 12 is a flowchart (1) of one example of switching point registration processing.

Next will be a description of one example of operation of the driving assistance device 1. FIG. 12 is a flowchart of one example of registration processing of a switching point for a merging zone.

At step S1, the high difficulty point extracting unit 70 extracts merging zones A1, A2, . . . and AM present on a planned travel route, as candidates for high difficulty points.

Assume that the total number of the merging zones A1 to AM extracted at this time is M.

At step S2, 1 is substituted for a variable i.

At step S3, the high difficulty point extracting unit 70 reads road map data of a merging zone Ai among the merging zones A1 to AM from the map database 23.

At step S4, the high difficulty point extracting unit 70 determines whether or not the distance L1 from the starting point of the merging zone Ai to the ending point thereof is below a threshold value. When the distance L1 is below the threshold value (step S4: Y), the high difficulty point extracting unit 70 determines that the merging zone Ai is a high difficulty point, and advances the processing to step S5.

When the distance L1 is not below the threshold value (step S4: N), the high difficulty point extracting unit 70 determines that the merging zone Ai is not a high difficulty point, and advances the processing to step S10.

At step S5, on the basis of road map data in a vicinity of the merging zone Ai, the switching point registering unit 71 determines, at a point located at the predetermined distance D1 before the merging zone Ai, whether or not a height difference between the travel lane 61 of the host vehicle 60 and the main lane 62 is equal to or more than a predetermined value H1, and the travel lane 61 is lower than the main lane 62. When the height difference is equal to or more than the predetermined value H1, and the travel lane 61 is lower than the main lane 62, the main lane 62 is hidden in a blind spot, so that it is necessary to register such a point as a switching point.

When the height difference is equal to or more than the predetermined value H1, and the travel lane 61 is lower than the main lane 62 (step S5: Y), the processing will proceed to step S6. When the height difference is not equal to or more than the predetermined value H1, or when the travel lane 61 is higher than the main lane 62 (step S5: N), the processing will proceed to step S7.

At step S6, the switching point registering unit 71 registers the point located at the predetermined distance D1 before the merging zone Ai as a switching point. In this example, the merging zone Ai is stored in the storage unit 72. Then, the processing will proceed to step S10.

At step S7, the switching point registering unit 71 determines, at the point located at the predetermined distance D1 before the merging zone 63, whether or not there is a shielding object having a predetermined height H2 or more between the travel lane 61 and the main lane 62. When there is such a shielding object, the main lane 62 is hidden in a blind spot, so that it is necessary to register such a point as a switching point.

When there is a shielding object having the predetermined height H2 or more between the travel lane 61 and the main lane 62 (step S7: Y), the processing will proceed to step S6. When there is no shielding object having the predetermined height H2 or more between the travel lane 61 and the main lane 62 (step S7: N), the processing will proceed to step S8.

At step S8, the switching point registering unit 71 determines, at the point located at the predetermined distance D1 before the merging zone 63, whether or not it is impossible to determine the traffic condition of the main lane 62 due to a road shape of the travel lane 61 of the host vehicle 60 and a road shape of the main lane 62.

For example, the switching point registering unit 71 determines whether or not the distance D2 (see FIG. 9) between the portion 94 of the main lane 62 present on the extended line of the traveling direction of the travel lane 61 at the point located at the predetermined distance D1 before the merging zone 63 and the point located at the predetermined distance D1 before the merging zone 63 is equal to or more than a predetermined value.

When the distance D2 is equal to or more than the predetermined value, it is determined that the detection resolution of the other vehicle 64 on the main lane 62 falling within the detection range 93 of the ambient environmental sensor group 10 is equal to or less than an allowable value, so that it is determined that the traffic condition cannot be determined.

When it is impossible to determine the traffic condition (step S8: Y), the processing will proceed to step S6. When it is not impossible to determine the traffic condition (step S8: N), the processing will proceed to step S9.

At step S9, the switching point registering unit 71 determines, at the point located at the predetermined distance D1 before the merging zone 63, whether or not the length L2 of the main lane range where the traffic condition of the main lane 62 is detectable by the ambient environmental sensor group 10 is below a predetermined length.

For example, when the difference θ between the traveling direction of the travel lane 61 at the point located at the predetermined distance D1 before the merging zone and the traveling direction of the main lane 62 is equal to or more than a predetermined threshold value (see FIG. 8), the switching point registering unit 71 may determine that the length L2 is below the predetermined length.

When the length L2 where the traffic condition of the main lane 62 is detectable by the ambient environmental sensor group 10 is too short, the traffic condition of the main lane 62 cannot be determined. Accordingly, when the length L2 is below the predetermined length (step S9: Y), the processing will proceed to step S6. When the length L2 is not below the predetermined length (step S9: N), the processing will proceed to step S10.

At step S10, the variable i is increased by one.

At step S11, it is determined whether or not the variable i is larger than the total number M of the merging zone A1 to AM, i.e., whether or not necessity of registration of switching points has been determined for all extracted merging zones. When the variable i is larger than the total number M (step S11: Y), the processing will end. When the variable i is equal to or less than the total number M (step S11: N), the processing will return to step S3.

Figure 13:
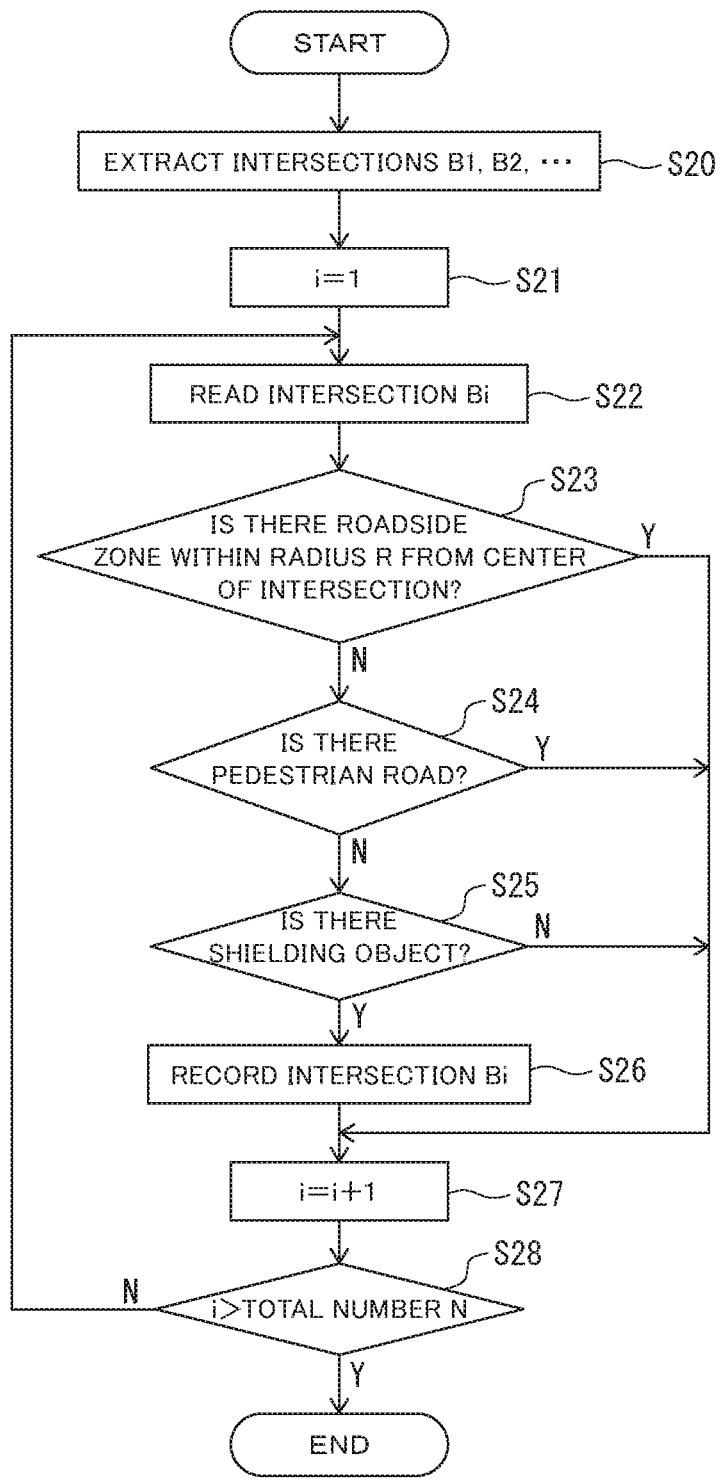
FIG. 13 is a flowchart (2) of one example of switching point registration processing.

FIG. 13 is a flowchart of one example of a switching point for an intersection. At step S20, the high difficulty point extracting unit 70 extracts intersections B1, B2, . . . and BN present on a planned travel route, as high difficulty points. Assume that the total number of the intersections B1 to BN extracted at this time is N.

At step S21, 1 is substituted for the variable i.

At step S22, the switching point registering unit 71 reads road map data of an intersection Bi among the intersections B1 to BN from the map database 23.

At step S23, the switching point registering unit 71 determines whether or not there is a roadside zone within the predetermined radius R from the center of the intersection Bi. When there is such a roadside zone, the intersection Bi has good visibility, so that it is unnecessary to register a point located at the predetermined distance D1 before the intersection Bi as a switching point.

Accordingly, when there is a roadside zone within the predetermined radius R from the center of the intersection Bi (step S23: Y), step S26 for registering a switching point is skipped, and the processing will proceed to step S27. When there is no roadside zone within the predetermined radius R from the center of the intersection Bi (step S23: N), the processing will proceed to step S24.

At step S24, the switching point registering unit 71 determines whether or not there is a pedestrian road before the intersection Bi. When there is a pedestrian road before the intersection Bi, the intersection Bi has good visibility as well. Thus, it is unnecessary to register the point located at the predetermined distance D1 before the intersection Bi.

Accordingly, when there is a pedestrian road before the intersection Bi (step S24: Y), the processing will proceed to step S27. When there is no pedestrian road before the intersection Bi (step S24: N), the processing will proceed to step S25.

At step S25, the switching point registering unit 71 determines whether or not the shielding object 96 is present at a corner of the intersection Bi. When the shielding object 96 is present at the corner of the intersection Bi, another lane 62 intersecting with the travel lane 61 is hidden in a blind spot created by the shielding object 96, so that it is difficult to determine the traffic condition of the other lane 62.

Thus, when the shielding object 96 is present at the corner of the intersection Bi (step S25: Y), the processing will proceed to step S26. When the shielding object 96 is not present at the corner of the intersection Bi (step S25: N), the processing will proceed to step S27.

At step S26, the switching point registering unit 71 registers the point located at the predetermined distance D1 before the intersection Bi as a switching point. In this example, the intersection Bi is stored in the storage unit 72. Then, the processing will proceed to step S27.

At step S27, the variable i is increased by one.

At step S28, it is determined whether or not the variable i is larger than the total number N of the intersections B1 to BN, i.e., whether or not necessity of registration of switching points has been determined for all extracted intersections. When the variable i is larger than the total number N (step S28: Y), the processing will end. When the variable i is equal to or smaller than the total number N (step S28: N), the processing will return to step S22.

Figure 14:
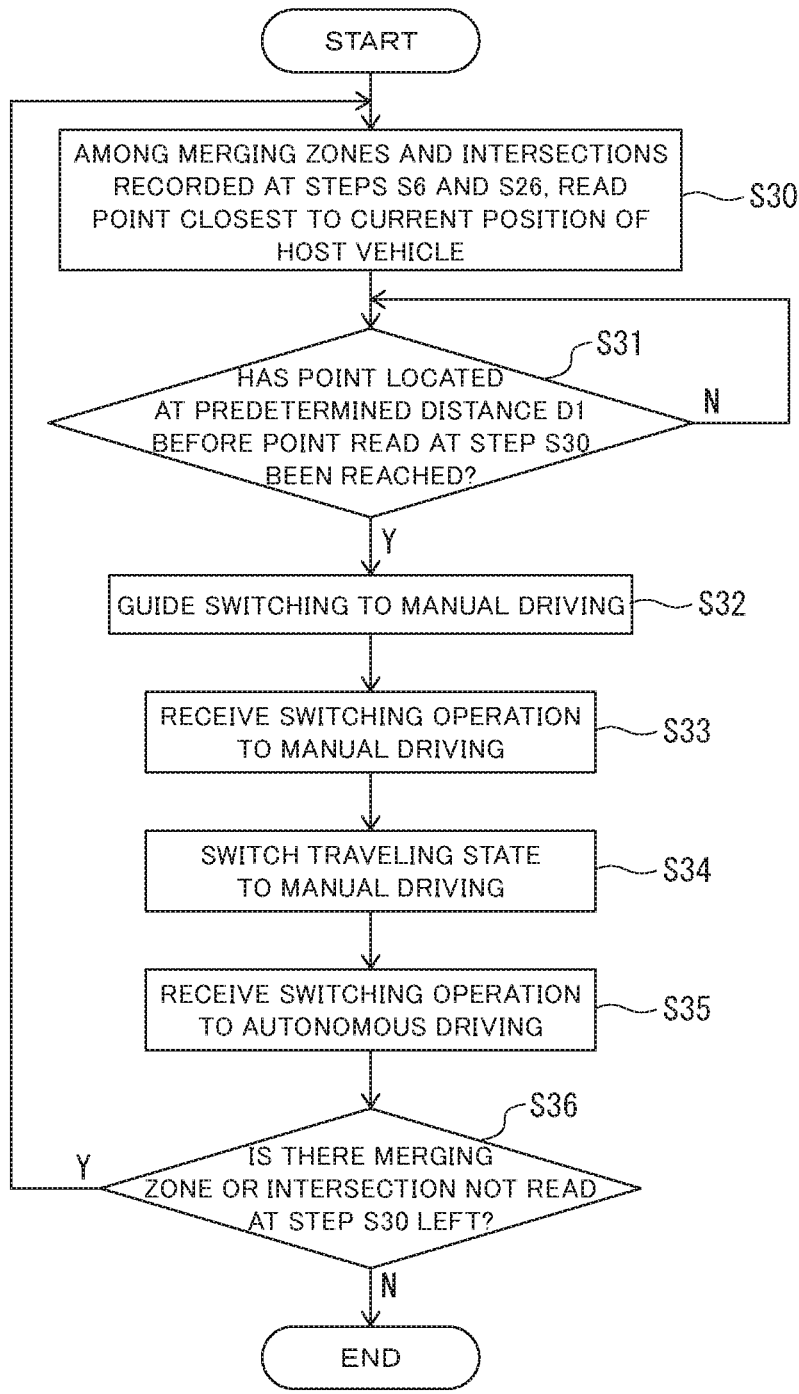
FIG. 14 is a flowchart of switching guidance during traveling.

FIG. 14 is a flowchart of switching guidance on the traveling state of the host vehicle 60 during traveling.

At step S30, the switching point registering unit 73 reads, from the storage unit 72, a point closest to a current position of the host vehicle 60 among the merging zones recorded at step S6 of FIG. 12 and the intersections recorded at step S26 of FIG. 13.

At step S31, the switching point registering unit 73 determines whether or not the host vehicle 60 has reached a point located at the predetermined distance D1 before the point read at step S30.

When the host vehicle 60 has reached the point located at the predetermined distance D1 before the point read at step S30 (step S31: Y), the switching control unit 73 will determine that it is time to guide switching to manual driving, and advance the processing to step S32. When the host vehicle 60 has not reached the point located at the predetermined distance D1 before the point read at step S30 yet (step S31: N), the processing will return to step S31.

At step S32, the switching control unit 73 guides switching of the traveling state of the host vehicle 60 from the autonomous driving mode to the manual driving mode.

At step S33, the switching control unit 73 receives switching operation to the manual driving mode by the driver. After receiving the switching operation, the switching control unit 73 switches the traveling state of the host vehicle 60 from the autonomous driving mode to the manual driving mode at step S34.

Then, after the host vehicle 60 has passed the high difficulty point, the switching control unit 73 receives switching operation from the manual driving mode to the autonomous driving mode by the driver at step S35. After receiving the switching operation, the switching control unit 73 switches the traveling state of the host vehicle 60 from the manual driving mode to the autonomous driving mode.

At step S36, the switching control unit 73 determines whether or not there is any merging zone or intersection not read in step S30 yet left.

When there is any merging zone or intersection not read yet (step S36: Y), the processing will return to step S30. When there is no merging zone or intersection not read yet left (step S36: N), the processing will end.

Effects of Embodiment (1) The high difficulty point extracting unit 70 extracts a point where the travel lane of the host vehicle 60 joins another lane, as a high difficulty point where autonomous driving is difficult. The switching control unit 73 guides switching of the traveling state of the host vehicle 60 from autonomous driving to manual driving, at a point located at the predetermined distance D1 before the high difficulty point.

By doing this, switching from autonomous driving to manual driving can be guided before the junction point, so that the driver can afford to start manual driving. This can suppress confusion of the driver due to switching guidance provided in the vicinity of the junction point (for example, suddenly just before the junction point).

(2) The high difficulty point may be the merging zone 63 where the host vehicle 60 merges by changing lanes from the travel lane 61 to the main lane 62 that is the other lane, and where the distance or the travel time from the starting point 80 of the merging zone 63 to the ending point 81 thereof is shorter than a threshold value.

Since there is less chance to change lanes on a short merging zone, autonomous driving may be difficult depending on traffic conditions such as the degree of congestion. By extracting a short merging zone involving lane change as a high difficulty point, and then providing switching guidance from autonomous driving to manual driving before the high difficulty point, the driver can afford to start manual driving.

(3) When the main lane 62 is hidden in a blind spot at the point located at the predetermined distance D1 before the merging zone 63, the switching control unit 73 guides switching of the traveling state from autonomous driving to manual driving, at the point located at the predetermined distance D1 before the merging zone 63.

If the traffic condition of the main lane 62 cannot be determined until the host vehicle 60 reaches the vicinity of the merging zone 63, and difficulty in merging while autonomously driving cannot be determined, it is uncertain whether or not switching of the traveling state from autonomous driving to manual driving can be guided with a time allowance.

Thus, When it is expected that the main lane 62 is hidden in the blind spot and the traffic condition of the main lane 62 cannot be determined at the point located at the predetermined distance D1 before the merging zone 63, switching of the traveling state from autonomous driving to manual driving is guided at the point located at the predetermined distance D1 before the merging zone 63. As a result, the driver can afford to start manual driving.

(4) When the height difference between the travel lane 61 and the main lane 62 is equal to or more than the predetermined value H1, and the travel lane 61 is lower than the main lane 62 at the point located at the predetermined distance D1 before the merging zone 63, the switching control unit 73 guides switching of the traveling state from autonomous driving to manual driving, at the point located at the predetermined distance D1 before the merging zone 63.

This makes it possible to determine that the main lane 62 is hidden in a blind spot when the height difference between the travel lane 61 and the main lane 62 is equal to or more than the predetermined value H1, and the travel lane 61 is lower than the main lane 62.

(5) When the shielding object 90 is present between the travel lane 61 and the main lane 62 at the point located at the predetermined distance D1 before the merging zone 63, the switching control unit 73 guides switching of the traveling state from autonomous driving to manual driving, at the point located at the predetermined distance D1 before the merging zone 63.

This makes it possible to determine that the main lane 62 is hidden in a blind spot when the shielding object 90 is present between the travel lane 61 and the main lane 62.

(6) When the traffic condition of the main lane 62 cannot be determined due to the road shape of the travel lane 61 and the road shape of the main lane 62 at the point located at the predetermined distance D1 before the merging zone 63, the switching control unit 73 guides switching of the traveling state from autonomous driving to manual driving, at the point located at the predetermined distance D1 before the merging zone 63.

Thus, when it is expected that the traffic condition of the main lane 62 cannot be determined at the point located at the predetermined distance D1 before the merging zone 63, switching of the traveling state from autonomous driving to manual driving is guided at the point located at the predetermined distance D1 before the merging zone 63, whereby the driver can afford to start manual driving.

(7) When the difference θ between the traveling direction 91 of the travel lane 61 at the point located at the predetermined distance D1 before the merging zone 63 and the traveling direction 92 of the main lane 62 is equal to or more than a predetermined threshold value, the switching control unit 73 guides switching of the traveling state from autonomous driving to manual driving at the point located at the predetermined distance D1 before the merging zone 63.

This makes it possible to determine that when the difference θ is equal to or more than the predetermined threshold value, the traffic condition of the main lane 62 cannot be determined due to the road shape of the travel lane 61 and the road shape of the main lane 62.

(8) When the distance D2 between the portion 94 of the main lane 62 present on the extended line of the traveling direction 91 of the travel lane 61 at the point located at the predetermined distance D1 before the merging zone 63 and the point located at the predetermined distance D1 before the merging zone 63 is equal to or more than a predetermined value, the switching control unit 73 guides switching of the traveling state from autonomous driving to manual driving, at the point located at the predetermined distance D1 before the merging zone 63.

This makes it possible to determine that when the distance D2 is equal to or more than the predetermined value, the traffic condition of the main lane 62 cannot be determined due to the road shape of the travel lane 61 and the road shape of the main lane 62.

(9) When the length L2 of the range of the main lane 62 where the traffic condition of the main lane 62 is detectable by the ambient environmental sensor group 10 is below a predetermined length at the point located on the predetermined distance D1 before the merging zone 63, the switching control unit 73 guides switching of the traveling state from autonomous driving to manual driving, at the point located at the predetermined distance D1 before the merging zone 63.

Thus, when it is expected that the traffic condition of the main lane 62 cannot be sufficiently detected by the ambient environmental sensor group 10 at the point located at the predetermined distance D1 before the merging zone 63, switching of the traveling state from autonomous driving to manual driving is guided at the point located at the predetermined distance D1 before the merging zone 63, whereby the driver can afford to start manual driving.

(10) The switching control unit 73 switches the traveling state of the host vehicle 60 from autonomous driving to manual driving at a point located at the predetermined distance D1 before a high difficulty point.

As a result, since switching to manual driving is performed before the junction point, the driver can afford to start manual driving. This can suppress confusion of the driver due to switching performed in the vicinity of the junction point (for example, suddenly, just before the junction point).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1: Driving assistance device
10: Ambient environmental sensor group
11: Distance measuring device
12: Camera
20: Navigation system
21: Navigation controller
22: Positioning device
23: Map database
24: Display unit
25: Operation unit
26: Audio output unit
27: Communication unit
30: Vehicle sensor group
31: Vehicle speed sensor
32: Acceleration sensor
33: Gyro sensor
34: Steering angle sensor
35: Accelerator sensor
36: Brake sensor
40: Controller
41: Processor
42: Storage device
43: Changeover switch
50: Vehicle control actuator group
51: Steering actuator
52: Accelerator position actuator
53: Brake control actuator
70: High difficulty point extracting unit
71: Switching point registering unit
72: Storage unit
73: Switching control unit

The invention claimed is:

1. A driving assistance method comprising:
    extracting a point where a travel lane of a host vehicle joins another lane on a planned travel route of the host vehicle and a traffic condition of the another lane cannot be determined, as a high difficulty point; and
    guiding switching of a traveling state of the host vehicle from autonomous driving to manual driving, at a point located at a predetermined distance before the high difficulty point.

2. The driving assistance method according to claim 1, wherein the high difficulty point is a merging zone where the host vehicle merges by changing lanes from the travel lane to a merging destination lane that is the other lane, and where a distance or a travel time from a starting point of the merging zone to an ending point of the merging zone is shorter than a threshold value.

3. The driving assistance method according to claim 2, wherein when the merging destination lane is hidden in a blind spot at the point located at the predetermined distance before the merging zone, the switching of the traveling state from autonomous driving to manual driving is guided at the point located at the predetermined distance before the merging zone.

4. The driving assistance method according to claim 3, wherein when a height difference between the travel lane and the merging destination lane is equal to or more than a predetermined value, and the travel lane is lower than the merging destination lane at the point located at the predetermined distance before the merging zone, the switching of the traveling state from autonomous driving to manual driving is guided at the point located at the predetermined distance before the merging zone.

5. The driving assistance method according to claim 3, wherein when there is a shielding object between the travel lane and the merging destination lane at the point located at the predetermined distance before the merging zone, the switching of the traveling state from autonomous driving to manual driving is guided at the point located at the predetermined distance before the merging zone.

6. The driving assistance method according to claim 2, wherein when a traffic condition of the merging destination lane cannot be determined due to a road shape of the travel lane and a road shape of the merging destination lane at the point located at the predetermined distance before the merging zone, the switching of the traveling state from autonomous driving to manual driving is guided at the point located at the predetermined distance before the merging zone.

7. The driving assistance method according to claim 6, wherein a difference between a traveling direction of the travel lane at the point located at the predetermined distance before the merging zone and a traveling direction of the merging destination lane is equal to or more than a predetermined threshold value, the switching of the traveling state from autonomous driving to manual driving is guided at the point located at the predetermined distance before the merging zone.

8. The driving assistance method according to claim 6, wherein when a distance between a portion of the merging destination lane present on an extended line of a traveling direction of the travel lane at the point located at the predetermined distance before the merging zone and the point is equal to or more than a predetermined value, the switching of the traveling state from autonomous driving to manual driving is guided at the point located at the predetermined distance before the merging zone.

9. The driving assistance method according to claim 2, wherein when a range of the merging destination lane where a traffic condition of the merging destination lane is detectable by a sensor mounted in the host vehicle at the point located at the predetermined distance before the merging zone has a length below a predetermined length, the switching of the traveling state from autonomous driving to manual driving is guided at the point located at the predetermined distance before the merging zone.

10. The driving assistance method according to claim 1, wherein the traveling state is switched from autonomous driving to manual driving at the point located at the predetermined distance before the high difficulty point.

11. A driving assistance device comprising:
   a sensor configured to detect an ambient environment of a host vehicle;
an actuator configured to realize at least one of driving, braking, and steering of the host vehicle; and
   a controller configured to perform autonomous driving by controlling the actuator on a basis of a detection result of the sensor, the controller extracting a point where a travel lane of the host vehicle joins another lane on a planned travel route of the host vehicle and a traffic condition of the another lane cannot be determined, as a high difficulty point, and guiding switching of a traveling state of the host vehicle from autonomous driving to manual driving, at a point located at a predetermined distance before the high difficulty point.

\* \* \* \* \*